(12) United States Patent
Winter et al.

(10) Patent No.: US 7,035,207 B2
(45) Date of Patent: Apr. 25, 2006

(54) SYSTEM AND METHOD FOR FORMING, MAINTAINING AND DYNAMIC RECONFIGURABLE ROUTING IN AN AD-HOC NETWORK

(75) Inventors: Timothy Clark Winter, Columbia, MD (US); Minakshisundaran B. Anand, Germantown, MD (US); Prakash R. Chakravarthi, Gaithersburg, MD (US)

(73) Assignee: EKA Systems, Inc, Germantown, MD (US)

( * ) Notice: Subject to any disclaimer, the term of this patent is extended or adjusted under 35 U.S.C. 154(b) by 0 days.

(21) Appl. No.: 10/162,077

(22) Filed: Jun. 5, 2002

(65) Prior Publication Data

US 2004/0008691 A1 Jan. 15, 2004

(51) Int. Cl.
*H04L 12/26* (2006.01)
*G06F 11/00* (2006.01)
*H04J 1/16* (2006.01)

(52) U.S. Cl. ...................... 370/225; 370/254; 370/351; 370/238; 370/238.1; 370/252; 455/445

(58) Field of Classification Search ................ 370/256, 370/408, 238, 255, 312, 338, 390, 469, 395.5, 370/252, 395.3, 254, 335, 351, 238.1, 395.43, 370/225; 455/453, 445, 519, 11.1, 13.1
See application file for complete search history.

(56) References Cited

U.S. PATENT DOCUMENTS

| | | | | |
|---|---|---|---|---|
| 5,553,094 A | | 9/1996 | Johnson et al. | 375/200 |
| 5,933,425 A | * | 8/1999 | Iwata | 370/351 |
| 5,987,011 A | | 11/1999 | Toh | 370/331 |
| 6,028,857 A | * | 2/2000 | Poor | 370/351 |
| 6,078,269 A | | 6/2000 | Markwell et al. | 340/825.5 |
| 6,104,712 A | | 8/2000 | Robert et al. | 370/389 |
| 6,307,843 B1 | * | 10/2001 | Okanoue | 370/312 |
| 6,456,599 B1 | * | 9/2002 | Elliott | 370/254 |
| 6,490,259 B1 | | 12/2002 | Agrawal et al. | 370/331 |
| 6,570,875 B1 | * | 5/2003 | Hegde | 370/389 |

(Continued)

*Primary Examiner*—Wellington Chin
*Assistant Examiner*—Chuong Ho
(74) *Attorney, Agent, or Firm*—Michael Bednarek; Pillsbury Winthrop Shaw Pittman, LLP

(57) ABSTRACT

A network comprises a plurality of network nodes. Each network node has a unique node identifier within the context of the network and stores a table of nodes. The table of nodes includes at least one table entry. The table entry includes three fields—a destination node field, a next node field and a cost field. The destination field is a unique node identifier corresponding to another node in the network. The next node is a unique node identifier corresponding to the next node in the communication path to the destination node. The cost field is the cost associated with communication with the network node. When a node is added to the network, it detects the presence of adjacent nodes. The new node obtains the table of nodes stored in each adjacent node and uses the information contained in the node tables to updates its own node table, thereby obtaining information for communicating with every other node in the network. Each of the adjacent nodes obtains information related to communicating with the new node, adjusts its own table of nodes accordingly, and sends update information to nodes adjacent to it to propagate knowledge of the new node. Changes in the network are propagated between network nodes by periodic exchange and updating of node tables. Updating can be performed at a pre-determined time and/or in response to a change in the network.

8 Claims, 5 Drawing Sheets

U.S. PATENT DOCUMENTS

| | | | |
|---|---|---|---|
| 6,633,544 B1 * | 10/2003 | Rexford et al. | 370/238 |
| 6,650,648 B1 * | 11/2003 | Du | 370/401 |
| 6,711,409 B1 * | 3/2004 | Zavgren et al. | 455/445 |
| 6,735,448 B1 * | 5/2004 | Krishnamurthy et al. | 455/522 |
| 6,781,982 B1 * | 8/2004 | Borella et al. | 370/352 |
| 6,836,463 B1 * | 12/2004 | Garcia-Luna-Aceves et al. | 370/238 |
| 6,845,091 B1 * | 1/2005 | Ogier et al. | 370/338 |

* cited by examiner

SYSTEM AND METHOD FOR FORMING, MAINTAINING AND DYNAMIC RECONFIGURABLE ROUTING IN AN AD-HOC NETWORK

BACKGROUND

1. Field of the Invention

This invention relates, in general, to networking and, in particular, to a methodology for the formation and maintenance of an ad-hoc network of wireless communication nodes and for routing messages in such a network.

2. Background of the Invention

Large networks of wireless communication nodes are expected to play an increasingly important role in networking sensors or actuators for a variety of applications. Such applications include seismic monitoring, precision agriculture, environmental and atmospheric monitoring, automated electricity, gas and water meter reading, industrial control and automation etc. Each wireless communication node in such networks will have limited range and will only be able to communicate with a few other nodes directly. In all such networks, the ad-hoc formation and maintenance of the network as new nodes join the network and nodes leave the network due to failure or removal is a requirement. The routing of messages from any source node in the network to any other destination node over multiple intermediate nodes or hops is also a further requirement.

Few examples of such ad-hoc network formation and routing exist in the prior art. One example is U.S. Pat. No. 5,987,011, issued to Toh, and incorporated herein for reference. In this patent, the routing methodology used starts with a directed broadcast from the source node. The broadcast message is further broadcast by each node in the network that receives the broadcast message, after modification of the message to include an identifier for the node that performs the further broadcast. Thus, by a repetition of this process, the broadcast reaches the destination node, presumably multiple times. By examining each such received broadcast message, the destination node can find the path that the message took through the network and deduce multiple paths from the source node to the destination node. Then, the destination node informs the source node of the routing paths it deduced through one of such deduced paths, thus enabling the source node to obtain a route to the destination node. A significant shortcoming of this methodology is the amount of traffic it generates since deduction of each route amounts to a flooding of the network. A further shortcoming is that no provision is made for evaluating various parameters of the routes such as latency, energy consumption etc. and for selecting a particular route over others.

U.S. Pat. No. 6,078,269, issued to Markwell, et al., and incorporated herein for reference describes a network of wireless sensor detectors but merely describes the networks as a "CSMA-type" network. Presumably, this implies that each node in the network merely listens for other nodes transmitting and transmits if possible. Thus, no provision is made for ad-hoc network formation, maintenance or routing across multiple hops.

U.S. Pat. No. 5,553,094, issued to Johnson, et al., and incorporated herein for reference describes a network of remote data gathering stations but uses a cellular communication scheme. This type of scheme requires that each of the nodes be in transmitting and receiving range of a base station and is thus a network of a different nature from an ad-hoc, multi-hop network; this patent provides no disclosure of the formation, maintenance or routing of such an ad-hoc multi-hop network.

U.S. Pat. No. 6,028,857, issued to Poor, and incorporated herein for reference, describes the formation and maintenance of a self-organizing network. This patent describes a "contour routing" scheme whereby each node in a network does not maintain a routing table but rather maintains a cost table for every other node. Typically, the cost table will contain a "hop count" value which indicates how many intermediate nodes are present in the path from the originating node to the destination node. When a node wishes to send a message to a destination, it attaches a cost to the message indicating how many hops the message should take to the destination and broadcasts the message to all neighboring nodes. Each of the neighboring nodes then examines the message, determines whether it is nearer to the destination than the originator and, if it is nearer, decrements the cost and again broadcasts to its neighbor. If a node that receives a message for another destination determines it is farther from the destination than the originator, the message is discarded. In this way, through multiple broadcasts, the message reaches its destination. However, it should be noted that during the initial formation of the network, a new node arriving in the network does not yet know the hop count to any destination node. In this case, according to this patent, a new node "floods" the network by sending a flood message that gets broadcast to every other node and to which every other node in the network replies. In this way, a new node learns about every other node in the network. The method described in this patent has two disadvantages. First, during normal operation of network, when a node wishes to send a message to a destination node, it is seen that the message is actually sent, and repeated by every node on every equivalent path from the originating node to the destination node. This is a very inefficient method since multiple unnecessary transmissions occur. Second, a new node joining the network triggers a flood of traffic in the entire network where every single node broadcasts the flood, and, further, each reply, also triggers broadcasts. This again, is an extremely inefficient method. Indeed, in large networks, the entire network may become bogged down a cease to function because of the huge amount of traffic triggered by just one node joining the network. Thus, the method described in this patent has some significant shortcomings that make it unsuitable for large networks.

There is thus a strong need for a methodology that addresses the requirements mentioned earlier of large ad-hoc networks of wireless communication nodes suitable for sensor networking applications.

It is thus an objective of the present invention to provide a methodology that allows for the formation and maintenance of an ad-hoc network of wireless communication nodes. It is a further objective of the present invention to provide for a routing methodology that allows the detection and use of optimum routes between any two nodes in the network based on a variety of criteria.

SUMMARY OF THE INVENTION

According to the present invention, each node in network maintains a table of other nodes it has knowledge of. These node tables are exchanged between adjacent nodes periodically and thus information on each node is propagated throughout the network. Each node also calculates and maintains as part of the node table a cost of communication with each neighbor. As the node tables are exchanged among adjacent nodes, the cost of communication for each link is summed up so that for any destination node in the node table, a node knows the total cost of communication to that node through each of one or more routes. Thus, a node can quickly evaluate and choose from among multiple routes. The cost of communication can be calculated based on a variety of parameters, thus allowing for optimization based on various criteria such as minimization of latency, minimization of energy consumption etc.

In one embodiment, the present invention is a network that has a plurality of network nodes. Each network node is adapted to detect the presence of an adjacent network node that is added to the network. Each network node stores a cost to communicate with each other node in the network through at least one communication path to each other node in the network.

In another embodiment, the present invention is a network node for use in a network. The network node includes a memory for storing an address of a destination node, an address of a next node and a cost for communicating with the destination node through the next node. The network node further includes means for detecting the presence of an adjacent node when a new node is added within communication range of the network node. The network node also includes means for transmitting the content of the memory to the adjacent node when the adjacent node is detected.

In another embodiment, the present invention is a method for forming a network by adding network nodes. The method includes the step of providing a unique identifier for a network node to be added to a network and storing the unique identifier in the new network node. The method further includes the step of storing a network table in the network node. The network table has a plurality of entries. Each entry has an address of a destination node, the address of the destination node being a unique identifier corresponding to the destination node, an address of a next node, the address of the next node being a unique identifier corresponding to an adjacent node to the network node being added to the network and a cost value, the cost value being the cost of communicating with the destination node from the network node.

DETAILED DESCRIPTION OF THE INVENTION

The embodiment of the invention is now described. In the present invention, it is assumed that each node in a network of wireless communication nodes is provided with the ability to discover the existence other nodes within wireless transmission and reception range. Such ability is typically provided by the link management layer in a wireless communication system and is well known in the art. The term "adjacent node" is used in this embodiment to refer to any such node which is within wireless transmission and reception range of a node. It is further assumed that each node in the network is provided with an identifier uniquely identifying the node in the entire network. Such unique identifiers or addresses are also well-known in the art.

Figure 1:
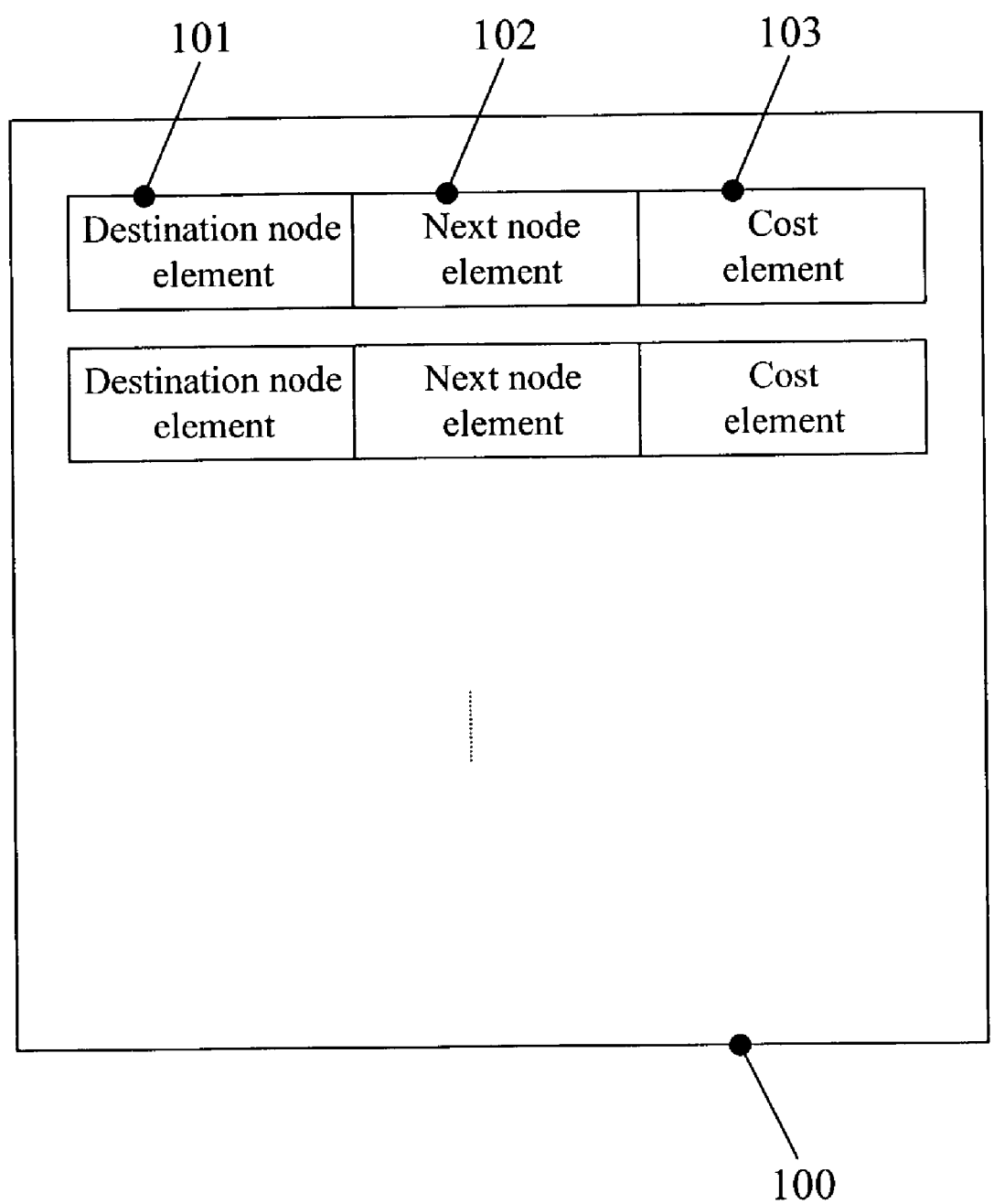
FIG. 1 is an exemplary network table according to an embodiment of the present invention

According to the present invention, each node maintains a table of nodes 100 of the form shown in FIG. 1. The table 100 consists of a list of entries, each entry consisting of a destination node element 101, a next node element 102 and a cost element 103. The destination node element 101 contains the identifier for a particular node in the network. The next node element 102 contains the identifier for an adjacent node to which messages intended for the destination node indicated by 101 should be forwarded to. The cost element 103 contains a cost associated with the communication of a message to the destination node indicated by 101. The means by which this communication cost is calculated is explained in detail later in this embodiment. At least one entry will exist in the node table 100 of each node for each other node that the node has knowledge of. Multiple entries can also exist in the node table 100 for any particular node. For example, two or more entries can exist for the same destination node but the value of the next node element will be different for each entry. In that case, the same destination node can be reached through multiple adjacent nodes. The table 100 then, provides each node with knowledge of every other node in the network and how to reach every other node.

Figure 2A:
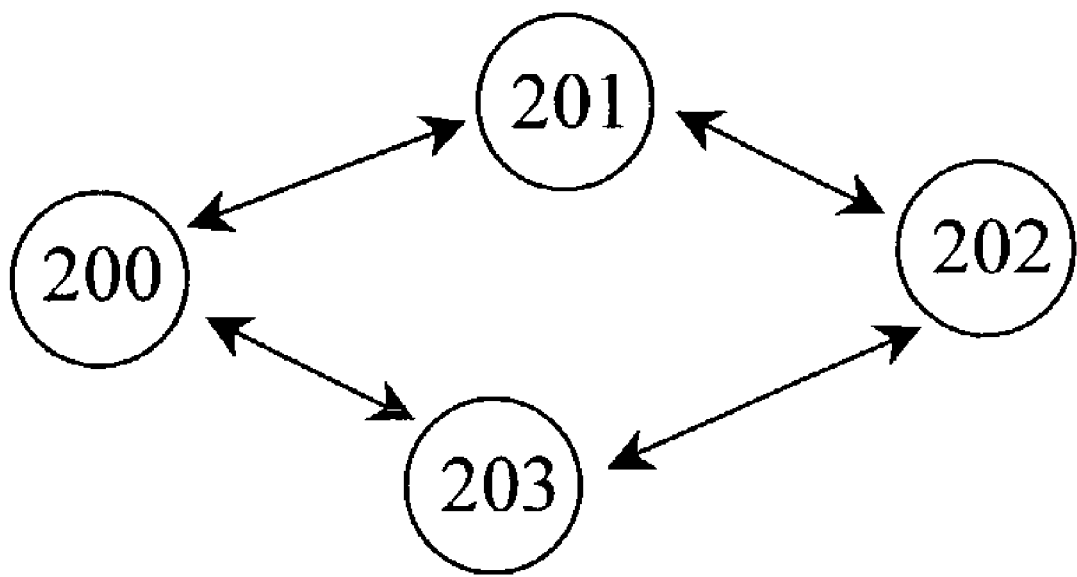
FIG. 2A is a schematic diagram illustrating an exemplary configuration of nodes in a network as a new node is introduced to the network according to an embodiment of the present invention.
Figure 2B:
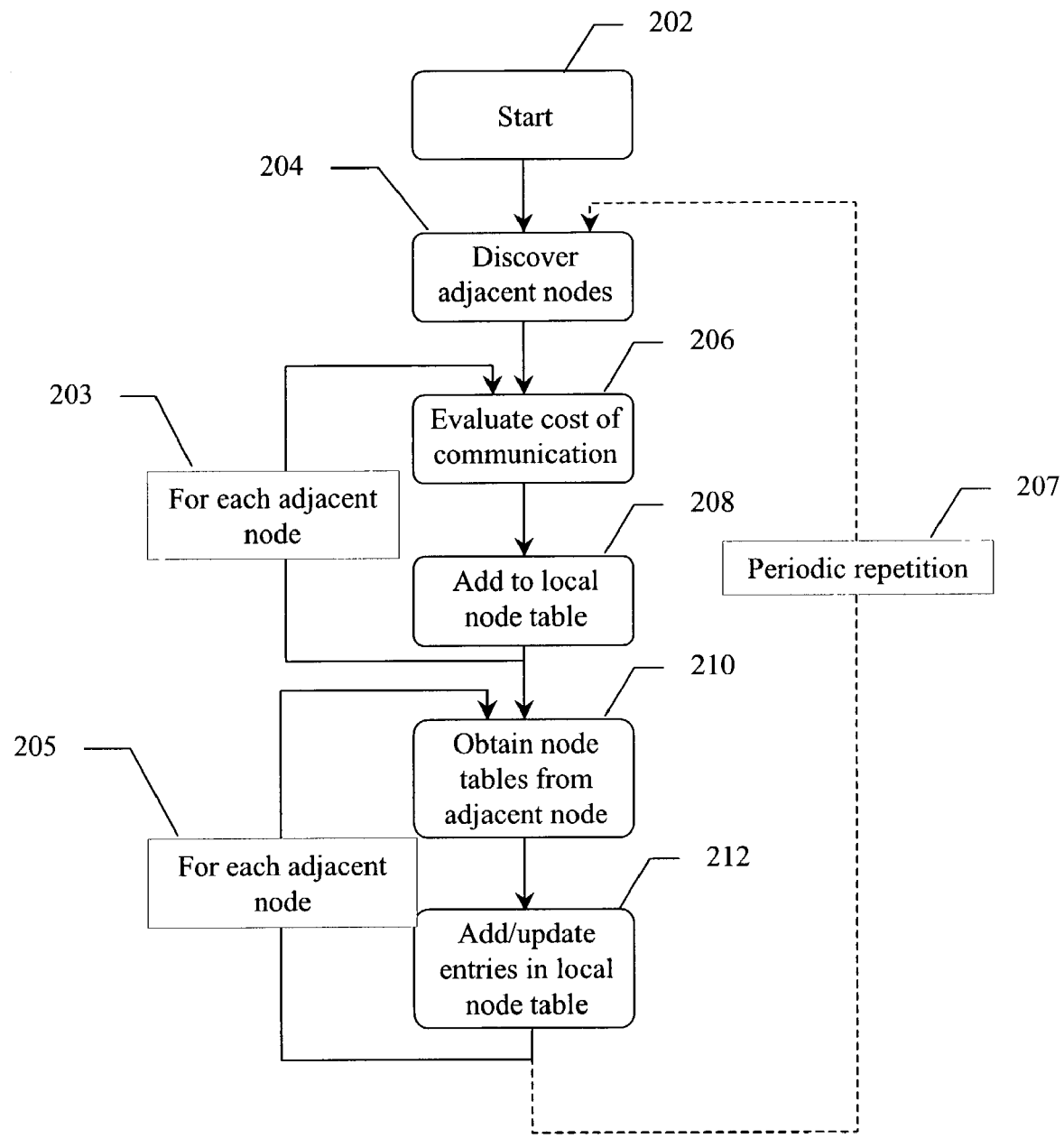
FIG. 2B is a flow chart for a method for forming and maintaining a network according to an embodiment of the present invention.

The construction and maintenance of the node table 100 at each node is thus the key for the formation and maintenance of the network. The construction of the table 100 is now described. Reference is made to FIGS. 2A and 2B, where the sequence of events in a node 200 newly joining the network is shown. FIG. 2A is a schematic diagram illustrating an exemplary configuration of nodes in a network as a new node is introduced to the network according to an embodiment of the present invention. FIG. 2B is a flow chart for a method for forming and maintaining a network according to an embodiment of the present invention.

As soon as a node starts its operation in step 202, it first engages in a discovery process to discover the existence of adjacent nodes in step 204. For each such adjacent node discovered (loop 203), the node 200 engages in a process of evaluating the "cost" of communicating with that adjacent node in step 206. This cost of communication is indicative of how easy or difficult it is for node 200 to establish a communication link with the adjacent node and maintain communications over the link. This cost can be evaluated by various parameters which may, for example, include, bit error rate, received signal strength, transmit power required, time required to established the communication link and number of retries required to establish the communication link. Depending on the type of the application, some of these parameters may be of relatively less importance compared to others, or even of no importance. Thus, in the present invention, the cost of communication for any particular communication link is calculated by first evaluating each of the constituent parameters, then weighting each parameter by multiplying the evaluated parameter value by an appropriate weighting factor and then summing all weighted parameter values. Other nonlinear schemes such as squaring a particular parameter value are also possible instead of multiplying a parameter value by a weighting factor. It must be noted that in this scheme of calculating the cost of a communication link, lesser cost is indicative of a better communication link. Thus, for some parameters which yield higher values when the communication link is better, inversion of the values will have to performed to obtain conformance to the general scheme.

Referring again to FIG. 2, once the process of evaluating the cost of communication with an adjacent node is completed, the node 200 adds an entry in its node table 100 for that adjacent node in step 208. For example, if the node 200 discovered another node 201, and if the cost of communication with 201 is $c_{201}$, the entry added would contain the identifier for 201 in the destination element and the next node element and the cost $c_{201}$ in the cost element. This addition of an entry in the node table is performed for each adjacent node discovered by the node 200.

It must be noted that although the above description describes the sequence events from the point of view of node 200, a similar sequence of events happens at node 201 as well. Thus, when node 200 discovers the existence of node 201 and begins communicating with it to evaluate the communication cost, node 201 automatically comes to know of the existence of node 200 and performs the steps of evaluation of the cost of communication with node 200 and subsequent addition of node 200 to its node table. Here, it must be noted that the evaluation of the cost of communication is not symmetric, ie., the cost calculated by node 200 for 201 will, in general, not be the same as the cost calculated for 200 by 201.

In loop 205, subsequent to the addition of the adjacent nodes to the node table, node 200 requests and obtains the respective node tables maintained at each of the adjacent nodes in step 210. The entries in each of the node tables thus obtained are added to the node table 100 maintained in 200 in step 212. For example, the case where node 201 has an adjacent node 202 is indicated in FIG. 2. In this case, the node table obtained by node 200 from node 201 will contain an entry where the identifier for node 202 is present in the destination element and in the next node element and for example, a cost $c_{202}$ is present in the cost element. Node 200 then adds a new entry in the node table with the destination element containing the identifier for node 202, the next node element containing the identifier for node 201, indicating that node 202 is reachable through node 201 and the cost element containing $c_{202}+c_{201}$, indicating the total cost to node 201 of communicating with node 202 through node 201.

Multiple entries for the same destination node may result during this process of obtaining node tables from adjacent nodes and adding entries to the local node table. For example, as shown in FIG. 2, node 200 has a second adjacent node 203 which is also adjacent to 202. In this case, the node table received by node 200 from node 203 will contain an entry with the destination element and the next node element containing the identifier for node 202 and for example, the cost element containing a cost $c_{202-2}$. Node 200 then adds a new entry in the node table with the destination element containing the identifier for node 202, the next node element containing the identifier for node 203, indicating that node 202 is reachable through node 203 and the cost element containing $c_{202-2}+c_{203}$ (assuming that the cost of communication with node 203 for node 200 is $c_{203}$), indicating the total cost to node 201 of communicating with node 202 through node 203. Thus, two entries are made for node 202 in the node table of node 200; however, the two entries indicate two different means of reaching node 202. The costs of communication associated with each means is also different.

Once again, it is noted that although the above description describes the sequence of events from the point of view of node 200, a similar sequence of events happens at nodes 201 and 203 as well. Thus, just as node 200 requests and obtains node tables from its adjacent nodes 201 and 203, nodes 201 and 203 also request and obtain the node table from their adjacent node 200 and update their node table accordingly as outlined above.

The sequence of events described in FIG. 2 is repeated by each node in the network periodically in loop 207, thus ensuring that changes in the node table of each node are propagated throughout the network.

Thus, it seen that scheme described above enables the knowledge of each node, and the means to reach that node, to propagate throughout the network. When new nodes join the network, not only does the new node receive information regarding every other node, information regarding the new node is also propagated throughout the network. Thus, the scheme described above enables the formation and maintenance of an ad-hoc network of wireless communication nodes.

Figure 3:
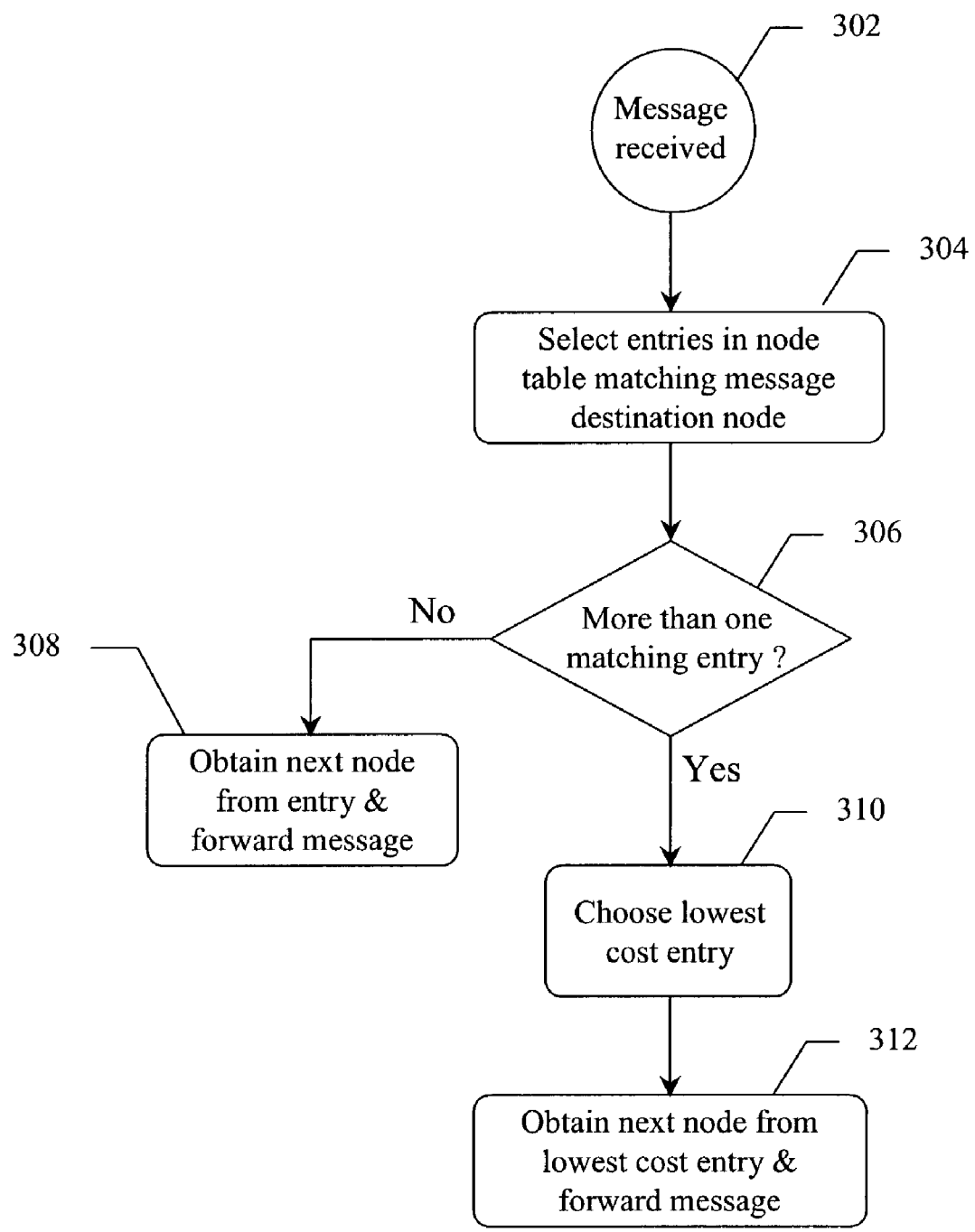
FIG. 3 is a flow chart illustrating a method for routing a message according to an embodiment of the present invention

Further, it is immediately seen that the existence of the node table at each node allows each node to route messages intended for any destination node in the network. A flow diagram of the sequence of operations involved in such routing is shown in FIG. 3. When a message is received by any node for a destination other than itself in step 302, the node table is consulted to obtain all entries whose destination node element value matches the destination of the message in step 304. If only one matching entry exists (determined in step 306), the message is forwarded to the node indicated by the next node element in that entry in step 308. If multiple entries exist (determined in step 306), the entry whose cost of communication is lowest is chosen in step 310 and the message is forwarded to the node indicated by the next node element in that entry in step 312.

Thus, this invention further provides not only a method of routing messages in an ad-hoc network of wireless communication nodes, but also a method of achieving optimized routing. Further, the routing scheme is flexible enough so that it can be quickly optimized for any one of many different and even conflicting criteria simply by changing the weights associated with the various parameters mentioned earlier.

Figure 4:
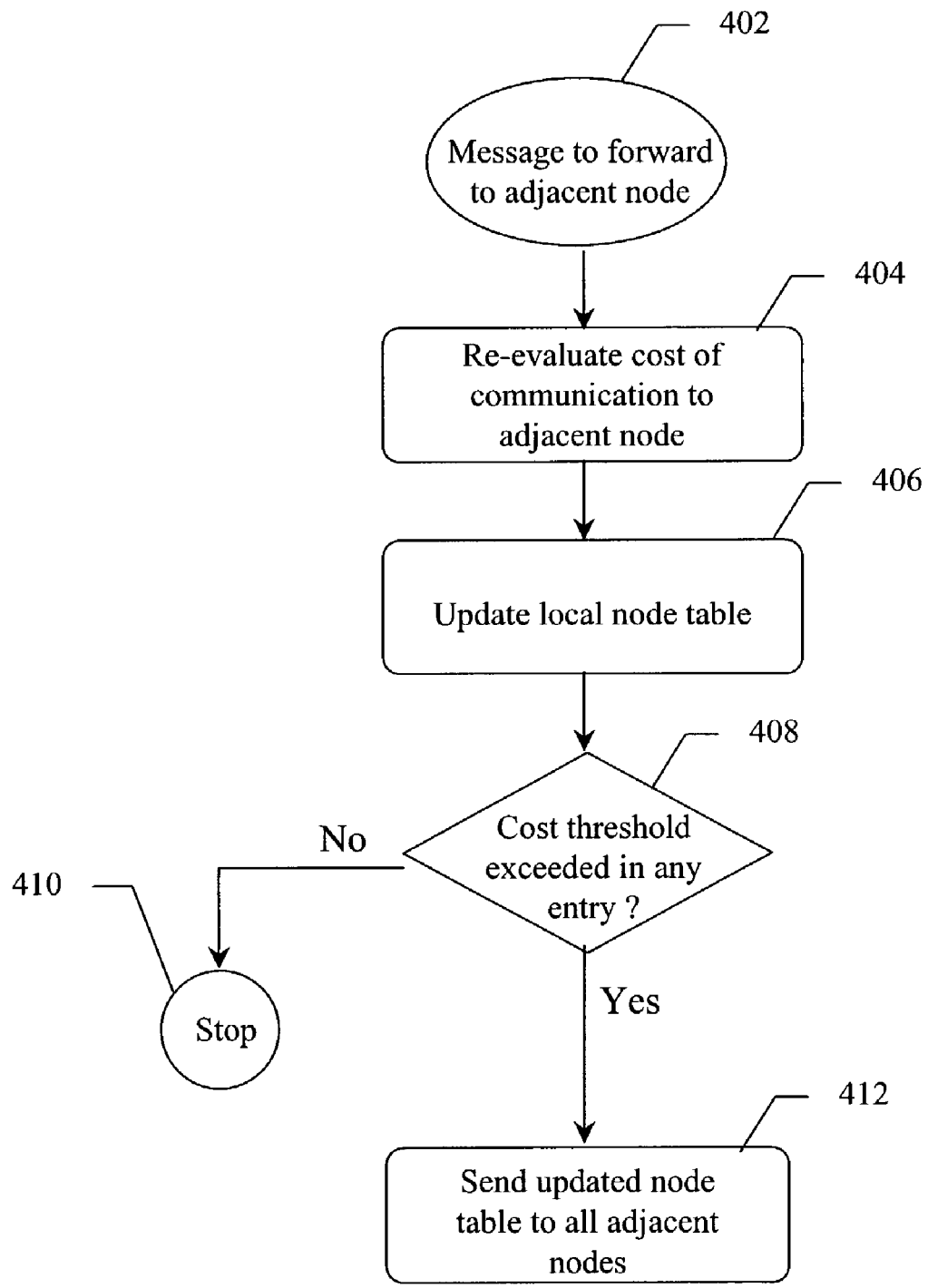
FIG. 4 is a flow chart illustrating a method for determining the presence of changes in a network and propagating that information to other nodes in the network according do an embodiment of the present invention.

The reaction of the network to changes is now described with reference to FIG. 4. Every time a node forwards a message to an adjacent node in step 402, the cost of communication to the adjacent node is re-evaluated in step 404 and the node table is updated accordingly in step 406, as shown in FIG. 4. Further, as shown in FIG. 4, if the re-evaluated cost of communication exceeds a pre-set threshold in any entry in the node table (determined in step 408), the node table is immediately sent to each adjacent node in step 412, otherwise the method ends in step 410. This exceedance of the pre-set threshold may happen when a sudden and drastic change in the communication link to that adjacent node occurs. For example, the adjacent node may have failed or a sudden change in the wireless propagation medium such as an obstruction of radio waves may have occurred. As each adjacent node receives the updated node table and merges it with its own node table, it too will find that the threshold is exceeded, thus triggering each adjacent node to further send its updated node table to each of its adjacent nodes. In this way, it is seen that drastic changes in the network such as node failure are quickly propagated throughout the network.

Changes and variations can be made to the embodiment described above to achieve even further benefits. For example, instead of a single cost element in the node table, several cost elements can be maintained based on different sets of weights or different parameters. Such a scheme allows different cost elements to be used in routing decision-making under different circumstances. Each message in the network could contain a message type, which is associated with a particular cost element. The present invention thus allows for dynamic change in the routing policy based on the priority of the message, enabling urgent messages to be routed based on latency, normal messages to be routed based on energy conservation and so on.

Another possible variation is to reduce the number node table entries maintained for any particular destination node. Thus, each time an entry for a particular destination node is added to the node table, checks could be performed to ensure that the number of entries for that destination node does not exceed a certain maximum number and, if it does, the entry with the highest communication cost among all the entries for that destination node could be deleted.

Yet another possible modification is to ensure that when any node sends its node table to an adjacent node as described earlier, the entries in the node table for that adjacent node are removed. Such entries are redundant since the adjacent node does not need to know about itself.

A further possible variation is to include a hop count element to each entry in the node table. This element indicates the number of hops required to reach a destination node. An adjacent node is considered to require one hop, and node adjacent to an adjacent node is considered to require two hops and so on. In this scheme, the construction of the node table proceeds as described earlier, the only additional rules being: the hop count element is set to a value of one for all adjacent node entries, and the hop count is incremented by one for each entry added from a node table obtained from an adjacent node. The advantage of this scheme is that routing decisions can now be based either on hop count or on the cost of communication. Since smaller hop count translates usually to lower latency, a hop-count based routing scheme may be advantageous in some applications requiring such lower latency.

Another possible modification to the routing scheme described above is to include a time-to-live counter with each message. This time-to-live counter is decremented each time a message is forwarded by a node to another node. If the counter reaches zero, further forwarding of the message does not occur and the message is discarded. The advantage of this scheme is that by limiting the maximum number of hops a message can travel, endless bouncing of messages across the network is prevented even if routing loops (a situation where a forwarded message arrives back at the node that forwarded the message in the first place) exist. In this scheme, the initial value of the time-to-live counter is set at the node originating the message based on the hop count value for the destination node in the chosen route.

In summary, then the methodology described in the above embodiment allows the formation and maintenance of an ad-hoc network of wireless communication network. The network reacts quickly to drastic changes in the network such as failure of a node by rapidly propagating the change throughout the network. Further, the routing of messages in the network can be optimized for various criteria such as latency, energy conservation etc. Indeed, the optimization of the routes for different criteria can even be performed on a per-message basis.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for building a network comprising a plurality of network nodes, comprising the steps of:
   (a) associating a unique identifier with a network node;
   (b) storing the unique identifier of the network node in the network node so that it can be accessed by other network nodes that are added to the network;
   (c) creating a network table in the network node, the network node having a plurality of entries, with at least one entry for each node in the network, each entry adapted to store a destination node address corresponding to a unique identifier associated with a destination node with which the network node can communicate, a next node address corresponding to a unique identifier associated with an adjacent node that is in a communication path from the network node to the destination node and a cost value corresponding to a cost for the network node to communicate with the destination node;
   (d) placing the network node in a network of other network nodes;
   (e) detecting an adjacent network node;
   (f) obtaining an adjacent network node entry from a table in an adjacent network node; and
   (g) creating a new entry in the table of the network node network using the information in the entry obtained from the adjacent network node, wherein the destination node address of the new entry is the unique identifier associated with the destination node of the adjacent network node entry, the next node address of the new entry is the unique identifier of the adjacent network node and the cost value is the sum of the cost value in the adjacent node entry and the cost of communicating with the adjacent network node.

2. The method recited in claim 1, further comprising the step of repeating steps (f) and (g) for each adjacent network node.

3. The method recited in claim 1, further comprising the step of repeating steps (f) and (g) for each adjacent network node for every node in the network.

4. The method recited in claim 1, further comprising the step of repeating steps (f) and (g) at pre-determined times.

5. The method recited in claim 1, further comprising the step of repeating steps (f) and (g) periodically.

6. The method recited in claim 1, further comprising the step of repeating steps (f) and (g) at pre-determined times for each adjacent network node for every network node in the network.

7. The method recited in claim 1, further comprising the step of repeating steps (f) and (g) periodically for each adjacent network node for every network node in the network.

8. The method recited in claim 1, further comprising the step of storing the unique identifier of the adjacent network node as the destination node address and next node address for at least one entry in the table.

* * * * *